Dec. 15, 1942.  M. L. WHITFIELD  2,304,979
INTERNAL COMBUSTION ENGINE
Filed Feb. 16, 1942
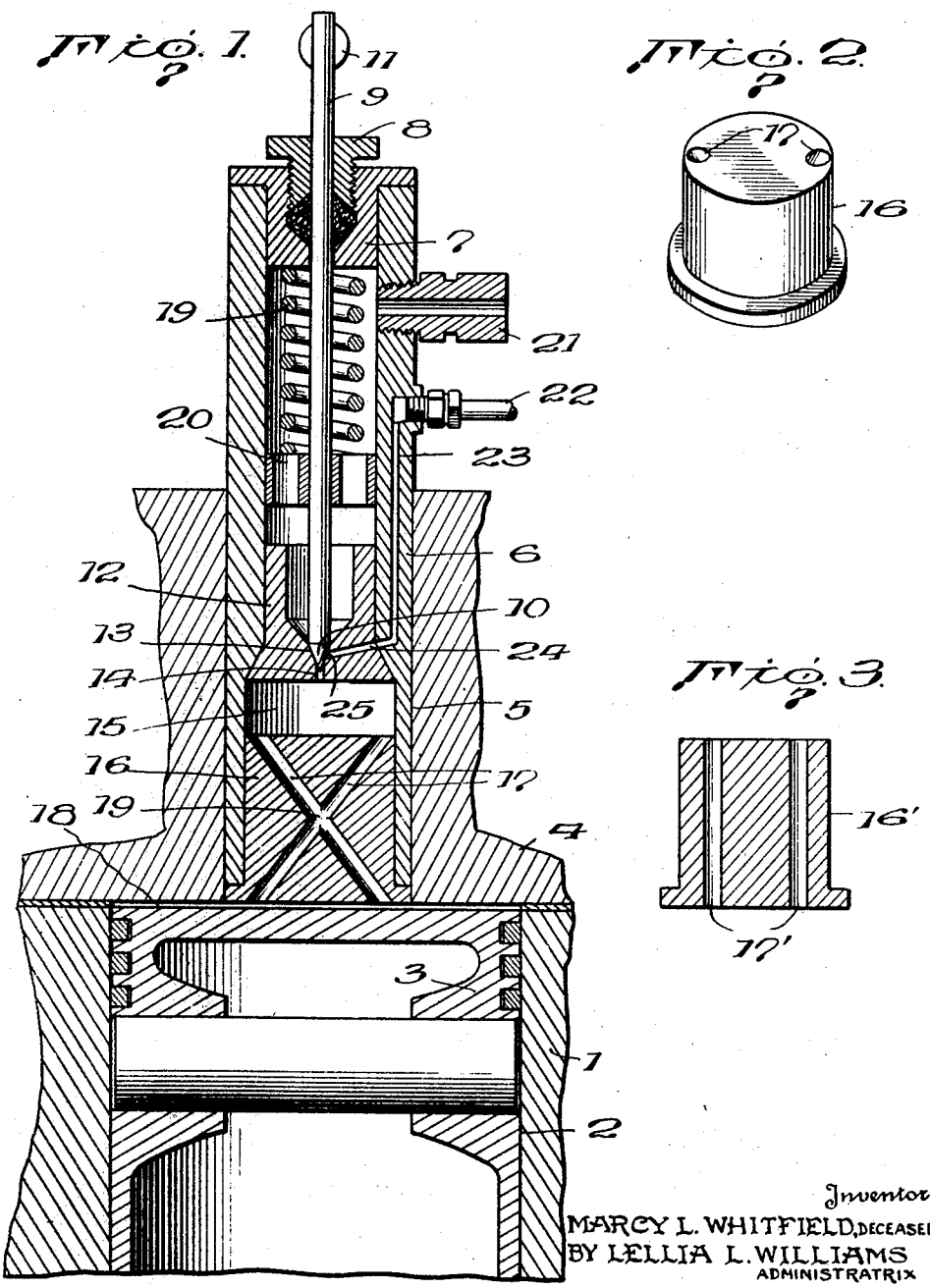
Inventor
MARCY L. WHITFIELD, DECEASED
BY LELLIA L. WILLIAMS
ADMINISTRATRIX
Attorneys Patented Dec. 15, 1942

2,304,979

UNITED STATES PATENT OFFICE 2,304,979

INTERNAL COMBUSTION ENGINE

Marcy L. Whitfield, deceased, late of Mount Gilead, Ohio, by Lellia L. Williams, administratrix, Clearwater, Fla.; said Lellia L. Williams, administratrix, assignor to Lellia L. Williams, Clearwater, Fla.

Application February 16, 1942, Serial No. 431,156

2 Claims. (Cl. 123—33)

The present invention relates to an internal combustion engine having means for imparting turbulence to the fuel and air mixture, so that more efficient combustion is obtained.

More specifically the present invention comprises an internal combustion engine having in the combustion chamber, or an extension thereof, means which will reduce the compression area and against which the incoming fuel and air mixture will impinge to cause the fuel to be better atomized and the fuel and air to be more thoroughly and intimately admixed before passing into the main portion of the combustion chamber. Preferably, the invention contemplates a member interposed between a preliminary mixing chamber and the main combustion chamber against which the incoming fuel and air mixture impinges, which member has passages therethrough out of alignment with the incoming fuel and air mixture for conducting the thoroughly admixed fuel and air to the main portion of the combustion chamber. Such passages may pass straight through such member in substantial parallelism, but preferably intersect one another, as such intersection of the passages tends to impart greater turbulence to the fuel and air passing through them, and to cause them to be more thoroughly admixed before entering the main combustion chamber.

The invention will be further described in connection with the accompanying drawing, but it is to be understood that such further description and illustration is merely by way of exemplification and that the invention is not limited thereby except to the extent set forth in the appended claims.

In the drawing:

Figure 1 is a vertical sectional view of an internal combustion engine embodying the present invention.

Fig. 2 is a perspective view of the member shown in Fig. 1 for imparting turbulence to the fuel and air mixture; and Fig. 3 is a vertical cross-sectional view of a modified form of member for imparting turbulence to the fuel and air mixture.

Although the invention will be described in detail in connection with an internal combustion engine of the Diesel type, it is to be understood that it is applicable to internal combustion engines of all types.

In the drawing 1 designates an engine block having a cylinder 2 containing a piston 3 which is connected to the crank shaft in the usual manner. The head of the engine 4 is provided with a bore 5 in substantial alignment with the center of the cylinder 2, and has tightly secured therein a housing 6.

The upper end of the housing 6 is closed by a valve guide bushing 7 and a packing gland 8 through which passes the stem 9 of a needle valve 10, which controls the introduction of fuel and air into the combustion chamber. The valve may be opened and closed at the proper times during the cycle of the engine in any suitable manner, for example, by a valve lifting lock 11 operated in any common manner from the crankshaft of the engine.

A valve seat and inlet bushing 12 extends across the housing 6 intermediate its ends. The valve seat and inlet bushing 12 has a valve seat 13 for the needle valve 10 and a central bore 14, normally closed by the valve 10, for conducting fuel and air into a mixing chamber 15 formed in the lower end of the housing 6 below the bushing 12.

A member 16 fills the lower end of the bore 5, and the portion of the housing 6 below the mixing chamber 15. The member 16 has passages 17 extending longitudinally therethrough for conducting the fuel and air mixture from the mixing chamber 15 to the main combustion chamber 18. The passages 17 may extend through the member 16 in any direction, but preferably intersect at 19, as such intersection of the streams of admixed fuel and air creates turbulence and causes a more intimate admixture of the fuel and air before the mixture is introduced into the main combustion chamber. Where the passages terminate at the lower end of the member 16 is not material, but at the upper end they should terminate adjacent the side of the member so that they will not be in alignment with the bore 14 in the valve seat and inlet bushing 12.

The member 16 performs several functions in the operation of the engine. It acts to reduce the compression area so that higher compression of the combustible mixture is obtained. By being positioned in alignment with the incoming fuel and air mixture it acts as a baffle or the like against which the incoming mixture impinges and causes the mixture to rebound and set up a turbulent condition in the mixing chamber 15, which results in the fuel being more finely atomized and admixed with the air before it passes into the main combustion chamber; and, as it becomes very hot during the operation of the engine, it facilitates the ignition and combustion of the fuel and air.

The needle valve 10 normally is retained in its seat by the force of a coil spring 20 surrounding the valve stem 9. At its upper end the spring bears against the under side of the valve guide bushing 7, and at its lower end it bears against a spider-like spring guide 21 rigidly secured to the valve stem but slidable within the bore of the housing 6, so that the force of the spring normally forces it and the valve stem downwardly until the valve 10 seats tightly on the seat 13.

Fuel is introduced under pressure into the interior of the housing 6 through a fuel inlet line 21. The air to be admixed with the fuel preferably is introduced through the needle valve seat and fuel inlet bushing 12, and to that end an air inlet line 22 communicates with a longitudinal passage 23 extending through the wall of the housing 6, which at its lower end communicates with a passage 24 which passes through the body of the needle valve seat and fuel inlet bushing and terminates in an air outlet opening 25 in the valve seat 13 which normally is closed by the needle valve 10.

In operation, the fuel and air in the fuel and air lines 21 and 22 are maintained under pressure so that at the proper time in the cycle of the engine, when the lifting valve lock raises the valve stem 9, a charge of fuel and air will pass through the bore 14 into the mixing chamber 15 and impinge against the upper end of the member 16. As the mixture of fuel and air impinges against the upper end of the member 16 it rebounds and sets up a turbulent condition within the mixing chamber which causes the fuel and air to be intimately admixed. The thoroughly atomized fuel admixed with the air passes through the passages 17 into the main portion of the combustion chamber where combustion takes place. After the mixture has been thoroughly combusted and expanded with resultant work it is discharged from the cylinder through the usual discharge valve, not shown.

The modified form of the member 16′ for imparting turbulence to the fuel and air mixture, shown in Fig. 3, is the same as the member 16 shown in Fig. 1, except that it has substantially parallel passages 17′ extending longitudinally therethrough for conducting the thoroughly atomized fuel admixed with the air from the mixing chamber to the main combustion chamber.

From the foregoing it will be seen that the present invention provides means of a very simple nature which will materially facilitate the ignition and complete combustion of the fuel and air which are introduced into the engine to form the combustible mixture.

What is claimed is:

1. An internal combustion engine comprising a cylinder having a combustion chamber, a mixing chamber, means for introducing fuel and air into the mixing chamber, and a member between the mixing chamber and the combustion chamber and in alignment with the fuel and air inlet means against which introduced fuel and air impinges for causing turbulence of the fuel and air, the portion of said member against which the introduced fuel and air impinges being imperforate, and said member having intersecting passages extending therethrough beyond the area against which the fuel and air impinges for conducting admixed fuel and air from the mixing chamber to the combustion chamber.

2. An internal combustion engine comprising a cylinder having a combustion chamber, a mixing chamber, means for introducing fuel and air into the mixing chamber, and a member rigidly fixed between the mixing chamber and the combustion chamber and in alignment with the fuel and air inlet means against which introduced fuel and air impinges for causing turbulence of the fuel and air, the portion of said member against which the introduced fuel and air impinges being imperforate, and said member having passages extending therethrough beyond the area against which the fuel and air impinges for conducting admixed fuel and air from the mixing chamber to the combustion chamber, said passages intersecting intermediate their length so that a space is provided intermediate the ends of the passages for commingling of the streams of admixed fuel and air passing through said passages to the combustion chamber.

LELLIA L. WILLIAMS,
*Administratrix of the Estate of Marcy L. Whitfield, Deceased.*